US009177022B2

(12) United States Patent
Taranov et al.

(10) Patent No.: US 9,177,022 B2
(45) Date of Patent: Nov. 3, 2015

(54) USER PIPELINE CONFIGURATION FOR RULE-BASED QUERY TRANSFORMATION, GENERATION AND RESULT DISPLAY

(75) Inventors: Viktoriya Taranov, Bellevue, WA (US); Pedro Dantas DeRose, Snoqualmie, WA (US); Victor Poznanski, Sammamish, WA (US); Yauhen Shnitko, Redmond, WA (US); Puneet Narula, Bothell, WA (US); Dmitriy Meyerzon, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 215 days.

(21) Appl. No.: 13/287,717

(22) Filed: Nov. 2, 2011

(65) Prior Publication Data
US 2013/0110860 A1   May 2, 2013

(51) Int. Cl.
*G06F 7/00*   (2006.01)
*G06F 17/30*   (2006.01)

(52) U.S. Cl.
CPC ................................ *G06F 17/30448* (2013.01)

(58) Field of Classification Search
CPC .................. G06F 17/30463; G06F 17/30448; G06F 17/3064; G06F 17/30867; G06F 17/30427; G06F 17/30442; G06F 17/30389; G06F 17/30474; G06F 17/30477; G06F 17/30545; G06F 3/0629; G06F 8/71; G06F 9/44505
See application file for complete search history.

(56) References Cited

U.S. PATENT DOCUMENTS

| 5,956,707 | A | 9/1999 | Chu |
|---|---|---|---|
| 6,122,664 | A | 9/2000 | Boukobza et al. |
| 7,149,738 | B2 | 12/2006 | Kumar et al. |
| 7,162,473 | B2 | 1/2007 | Dumais |
| 7,440,964 | B2 | 10/2008 | Gosse et al. |
| 7,591,010 | B2 | 9/2009 | Shelest et al. |
| 7,640,236 | B1 | 12/2009 | Pogue |
| 7,962,633 | B1 | 6/2011 | Sidebottom et al. |
| 8,041,713 | B2 | 10/2011 | Lawrence |
| 8,341,692 | B1 | 12/2012 | Boyer et al. |
| 2003/0051020 | A1 | 3/2003 | Kadam et al. |

(Continued)

FOREIGN PATENT DOCUMENTS

| CN | 1609859 A | 4/2005 |
|---|---|---|
| CN | 101292236 A | 10/2008 |

(Continued)

OTHER PUBLICATIONS

PCT Search Report dated Mar. 11, 2013 in Appln No. PCT/US2012/063134.

(Continued)

*Primary Examiner* — Azam Cheema
(74) *Attorney, Agent, or Firm* — Tom Wong; Danielle Johnston-Holmes; Micky Minhas

(57) ABSTRACT

A query pipeline for an enterprise search system is configurable by a user of the system. A user may create rules for custom query transformation and parallel query generation, federation of queries, mixing of results and application of display layouts to the received search results. A user interface (UI) assists a user in configuring the search pipeline. For example, a user may enter condition action rules for queries that affect how a query is transformed, how parallel queries are generated, how queries are federated, how search results are ranked and displayed, how rules are ordered and the like.

20 Claims, 24 Drawing Sheets

(56) References Cited

U.S. PATENT DOCUMENTS

| | | | |
|---|---|---|---|
| 2003/0078914 A1* | 4/2003 | Witbrock | 707/3 |
| 2004/0215630 A1 | 10/2004 | Parekh et al. | |
| 2004/0243587 A1 | 12/2004 | Nuyens et al. | |
| 2005/0021504 A1* | 1/2005 | Atchison | 707/3 |
| 2005/0091671 A1 | 4/2005 | Deem et al. | |
| 2005/0154744 A1 | 7/2005 | Morinville | |
| 2006/0167858 A1 | 7/2006 | Dennis et al. | |
| 2006/0224607 A1 | 10/2006 | Tchaitchian et al. | |
| 2006/0236381 A1 | 10/2006 | Weeden | |
| 2006/0287980 A1 | 12/2006 | Liu et al. | |
| 2007/0219979 A1* | 9/2007 | Jung et al. | 707/5 |
| 2007/0282986 A1 | 12/2007 | Childress et al. | |
| 2007/0294225 A1 | 12/2007 | Radlinski | |
| 2008/0209047 A1 | 8/2008 | Beigi et al. | |
| 2008/0288467 A1 | 11/2008 | Szeto et al. | |
| 2008/0301113 A1 | 12/2008 | Chi et al. | |
| 2009/0094216 A1* | 4/2009 | Hou et al. | 707/4 |
| 2009/0171907 A1 | 7/2009 | Radovanovic | |
| 2009/0234799 A1* | 9/2009 | Betawadkar-Norwood et al. | 707/2 |
| 2009/0292700 A1 | 11/2009 | Castellani | |
| 2009/0299992 A1 | 12/2009 | Klinger et al. | |
| 2009/0307205 A1 | 12/2009 | Churchill et al. | |
| 2010/0005496 A1 | 1/2010 | Ellis et al. | |
| 2010/0085906 A1 | 4/2010 | Yamamoto | |
| 2010/0106724 A1 | 4/2010 | Anderson | |
| 2010/0145944 A1 | 6/2010 | Punera | |
| 2010/0185678 A1 | 7/2010 | Dettinger et al. | |
| 2010/0223546 A1 | 9/2010 | Liu | |
| 2011/0016104 A1 | 1/2011 | Leconte | |
| 2011/0137902 A1 | 6/2011 | Wable et al. | |
| 2011/0153671 A1 | 6/2011 | Taniguchi | |
| 2011/0208670 A1 | 8/2011 | Joseph et al. | |
| 2011/0246499 A1* | 10/2011 | Carmel et al. | 707/769 |
| 2011/0265189 A1 | 10/2011 | Liao et al. | |
| 2012/0072406 A1 | 3/2012 | Iwakura et al. | |
| 2012/0089641 A1 | 4/2012 | Wilde et al. | |
| 2013/0046787 A1* | 2/2013 | Ford et al. | 707/779 |
| 2013/0110795 A1 | 5/2013 | DeRose et al. | |
| 2013/0110813 A1 | 5/2013 | Holm et al. | |
| 2013/0110816 A1 | 5/2013 | Khan et al. | |

FOREIGN PATENT DOCUMENTS

| | | |
|---|---|---|
| CN | 102043833 A | 5/2011 |
| CN | 102165447 A | 8/2011 |
| KR | 10-0714504 | 5/2007 |
| WO | 2006/071928 A2 | 7/2006 |

OTHER PUBLICATIONS

PCT Search Report dated Mar. 28, 2013 in Appln No. PCT/US2012/063135.

U.S. Official Action mailed May 8, 2013 in U.S. Appl. No. 13/287,645, 23 pgs.

Pirahesh, et al., "A Rule Engine for Query Transformation in Starburst and IBM DB2 C/S DBMS: The Missing Manual", In Proceedings of 13th International Conference on Data Engineering, Apr. 7-11, 1997, pp. 391-400.

Ioannidis, Y., "Query Optimization", Retrieved on: Sep. 2, 2011, Available at: http://infolab.stanford.edu/~widom/cs346/ioannidis.pdf.

"What is Visitor Traffic & Analytic Rules and How is it Setup?", Retrieved on: Sep. 2, 2011, Available at: http://www.americommerce.com/kb/afmviewfaq.aspx?faqid=297.

"Advanced Development Techniques using OBIEE Plus", Retrieved on: Aug. 30, 2011, Available at: http://www.rittmanmead.com/files/Advanced%20Development%20Techniques%20Using%20OBIEE%20Plus.pdf.

"Update Statement", Retrieved on: Aug. 30, 2011, Available at: http://publib.boulder.ibm.com/infocenter/db2luw/v8/index.jsp?topic=/com.ibm.db2.udb.doc/admin/r0001022.htm.

"Managing Firewall Services", Retrieved on: Aug. 30, 2011, Available at: http://www.cisco.com/en/US/docs/security/security_management/cisco_security_manager/security_manager/3.1/user/guide/porules.html.

U.S. Appl. No. 13/287,997, filed Nov. 2, 2011 entitled "Routing Query Results".

U.S. Appl. No. 13/287,999, filed Nov. 2, 2011 entitled "Default Query Rules".

U.S. Appl. No. 13/287,645, filed Nov. 2, 2011 entitled "Inheritance of Rules Across Hierarchical Levels".

Anagnostopoulos et al., "An Optimization Framework for Query Recommendation", Copyright 2010, 10 pages.

Aronis et al., The World: Knowledge Discovery from Multiple Distributed Databases, published 1997, 5 pages.

Curran, Steve, "SharePoint 2010 Search Scopes Explained", Published on: Jul. 23, 2011, Available at: http://sharepointfieldnotes.blogspot.com/2011_07_01_archive.html.

Elmongui et al., A Framework for Testing Query Transformation Rules, copyright 2009, 12 pages.

Query Rewrite Optimization Guidelines, accessed at: http://publib.boulder.ibm.com/infocenter/db2luw/v9r7/index.jsp?topic=%2Fcom.ibm.db2.luw.admin.perf.doc%2Fdoc%2Fc0024525.html, accessed on Sep. 5, 2011, 4 pages.

Rittman, Mark, Advanced Development Techniques using OBIEE Plus, accessed at http://www.rittmanmead.com/files/Advanced%20Development%20Techniques%20Using%20OBIEE%20Plus.pdf accessed on Sep. 5, 2011, 86 pages.

Set operations (SQL), accessed at http://en.wikipedia.org/wiki/Set_operations_(SQL), accessed on Sep. 5, 2011, 4 pages.

Shankar, et al., "Specification-enhanced Policies for Automated Management of Changes in It Systems", In Proceedings of the 20th conference on Large Installation System Administration, 2006, 16 pages.

"Symantec Endpoint Protection 11.0", Retrieved on: Sep. 13, 2011, Available at: http://www.symantec.com/avcenter/security/ADC/Configuring_Application_Control_1.1.pdf.

Shankar, et al., "An ECA-P Policy-based Framework for Managing Ubiquitous Computing Environments", In Proceedings of the Second Annual International Conference on Mobile and Ubiquitous Systems: Networking and Services, Jul. 17-21, 2005, 10 pages.

U.S. Official Action mailed Dec. 3, 2013 in U.S. Appl. No. 13/287,645, 20 pgs.

U.S. Official Action mailed Jan. 17, 2014 in U.S. Appl. No. 13/287,997, 25 pgs.

U.S. Official Action mailed Feb. 6, 2014 in U.S. Appl. No. 13/287,999, 29 pgs.

U.S. Official Action mailed May 22, 2014 in U.S. Appl. No. 13/287,645, 25 pgs.

U.S. Official Action mailed Jun. 17, 2014 in U.S. Appl. No. 13/287,997, 18 pgs.

U.S. Official Action mailed Jun. 17, 2014 in U.S. Appl. No. 13/287,999, 19 pgs.

U.S. Official Action mailed Mar. 16, 2015 in U.S. Appl. No. 13/287,645, 24 pgs.

U.S. Official Action mailed Apr. 24, 2015 in U.S. Appl. No. 13/287,999, 25 pgs.

U.S. Official Action mailed May 4, 2015 in U.S. Appl. No. 13/287,997, 23 pgs.

Chinese Office Action and Search Report dated Jan. 7, 2015 in Appln No. 201210428079.9, 12 pgs.

Chinese Office Action and Search Report dated Jan. 23, 2015 in Appln No. 201210429730.4, 15 pgs.

EP Extended Search Report dated Aug. 31, 2015 in Appln No. PCT/US2012/063134, 8 pgs.

Notice of Allowance mailed Jul. 8, 2015 in U.S. Appl. No. 13/287,645, 11 pgs.

* cited by examiner

Order Selected Rules Using a Group

◉ Move rules to new group with this name

○ Move rules to existing group

○ Remove rules from their current group

OK    Cancel

☐ More Conditions          Query is performed on these sources
  [More Conditions         ⦿ All sources
  instructional text]      ○ One of these sources
                              Add Source Query is performed on these categories
                           ⦿ All categories
                           ○ One of these categories
                              Add Category

*Fig. 19*

☐ Publishing         ☑ Is Active
[publishing
instructional text]   Start Date
                     ┌──────────────┬──┐
                     │ Any Time     │📅│
                     └──────────────┴──┘
                     End Date
                     ┌──────────────┬──┐
                     │ Never        │📅│
                     └──────────────┴──┘
                     Review Date
                     ┌──────────────┬──┐
                     │ Never        │📅│
                     └──────────────┴──┘
                     Contact
                     ┌─────────────────┐
                     │                 │
                     └─────────────────┘

*Fig. 20*

Add Source

Select a Federated Source

[ Default Source          ⌄ ]

[ Add Source ]  [ Cancel ]

Edit Result Block

[Result Block Instructional Text]

Available Query Variables
{searchTerms} - the entire query
{subjectTerms} - the matched person name Block Title
[Block Title Instructional Text]

○ This block is always shown above core results
⦿ This block is ranked within core results (may not show)

Configure Query

"More" Link Behavior
⦿ Do not show a "more" link
○ "More" link goes to the following URL

[                    ]  [Replace Query Text]

Group Display Template URL
[http://url/to/default/group/template]

Item Display Template URL
[                    ]

[Add Result Block]  [Cancel]

*Fig. 24*

USER PIPELINE CONFIGURATION FOR RULE-BASED QUERY TRANSFORMATION, GENERATION AND RESULT DISPLAY

BACKGROUND

Many search applications execute queries in a pre-set pipeline. During the flow through the pipeline a fixed set of actions are applied to the query. Making any change to the pipeline can be a very difficult process. For example, a developer and/or a sophisticated administrator may have to spend considerable time to customize the pipeline.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A query pipeline for an enterprise search system is configurable by a user of the system. A user may create rules for custom query transformation and parallel query generation, federation of queries, mixing of results and application of display layouts to the received search results. A user interface (UI) assists a user in configuring the search pipeline. For example, a user may enter condition action rules for queries that affect how a query is transformed, how parallel queries are generated, how queries are federated, how search results are ranked and displayed, how rules are ordered and the like.

BRIEF DESCRIPTION OF THE DRAWINGS

FIGS. 6-24 show exemplary UI displays for configuring a search pipeline.

DETAILED DESCRIPTION

Figure 1:
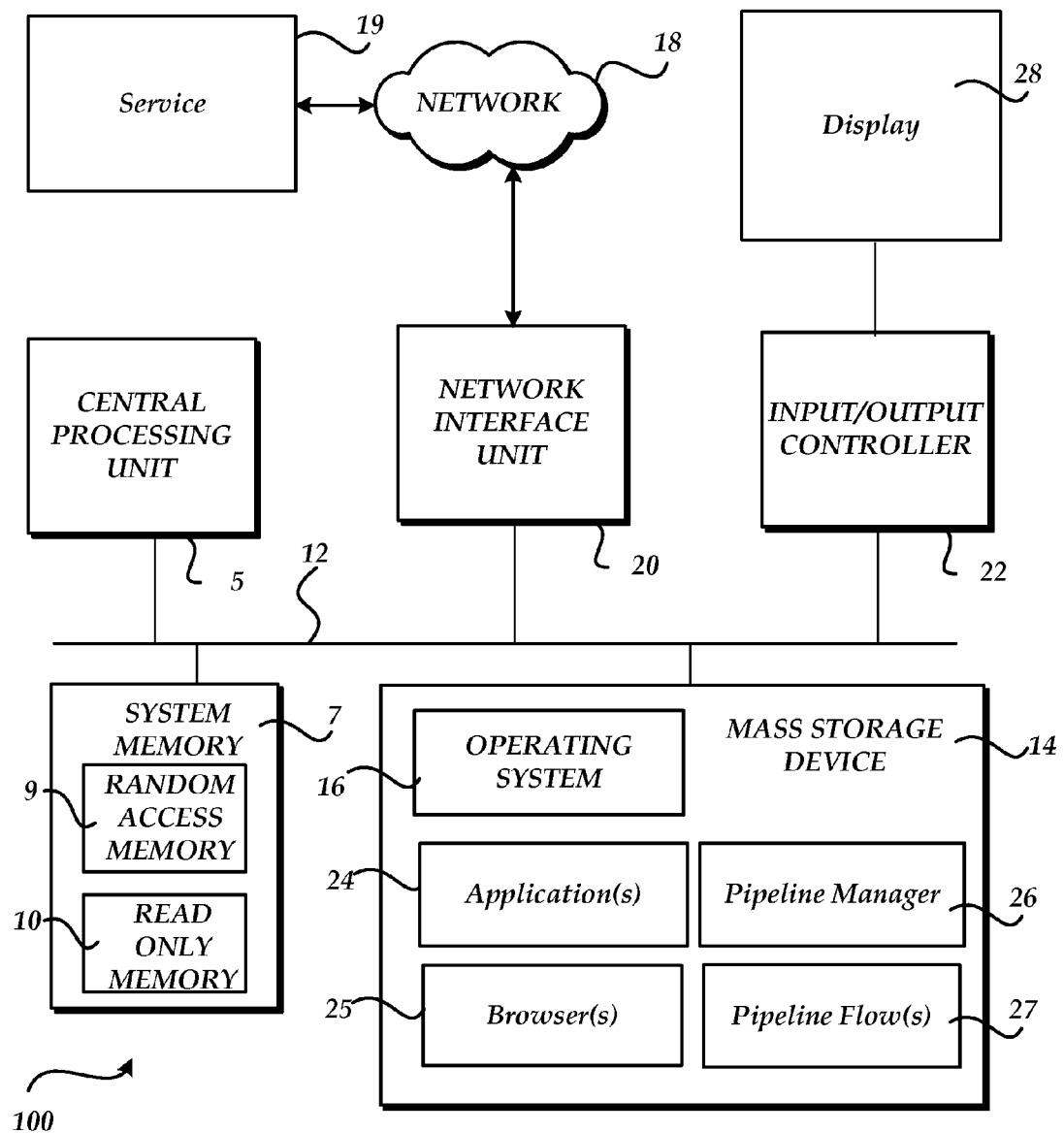
FIG. 1 illustrates an exemplary computing device.

Referring now to the drawings, in which like numerals represent like elements, various embodiments will be described. In particular, FIG. 1 and the corresponding discussion are intended to provide a brief, general description of a suitable computing environment in which embodiments may be implemented.

Generally, program modules include routines, programs, components, data structures, and other types of structures that perform particular tasks or implement particular abstract data types. Other computer system configurations may also be used, including hand-held devices, multiprocessor systems, microprocessor-based or programmable consumer electronics, minicomputers, mainframe computers, and the like. Distributed computing environments may also be used where tasks are performed by remote processing devices that are linked through a communications network. In a distributed computing environment, program modules may be located in both local and remote memory storage devices.

Referring now to FIG. 1, an illustrative computer architecture for a computer 100 utilized in the various embodiments will be described. The computer architecture shown in FIG. 1 may be configured as a server computing device, a desktop computing device, a mobile computing device (e.g. smartphone, notebook, tablet . . . ) and includes a central processing unit 5 ("CPU"), a system memory 7, including a random access memory 9 ("RAM") and a read-only memory ("ROM") 10, and a system bus 12 that couples the memory to the central processing unit ("CPU") 5.

A basic input/output system containing the basic routines that help to transfer information between elements within the computer, such as during startup, is stored in the ROM 10. The computer 100 further includes a mass storage device 14 for storing an operating system 16, application(s) 24, pipeline flows 27, and other program modules, such as Web browser 25, and pipeline manager 26 which will be described in greater detail below.

The mass storage device 14 is connected to the CPU 5 through a mass storage controller (not shown) connected to the bus 12. The mass storage device 14 and its associated computer-readable media provide non-volatile storage for the computer 100. Although the description of computer-readable media contained herein refers to a mass storage device, such as a hard disk or CD-ROM drive, the computer-readable media can be any available media that can be accessed by the computer 100.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, Erasable Programmable Read Only Memory ("EPROM"), Electrically Erasable Programmable Read Only Memory ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer 100.

According to various embodiments, computer 100 may operate in a networked environment using logical connections to remote computers through a network 18, such as the Internet. The computer 100 may connect to the network 18 through a network interface unit 20 connected to the bus 12. The network connection may be wireless and/or wired. The network interface unit 20 may also be utilized to connect to other types of networks and remote computer systems. The computer 100 may also include an input/output controller 22 for receiving and processing input from a number of other devices, such as a touch input device. The touch input device may utilize any technology that allows single/multi-touch input to be recognized (touching/non-touching). For example, the technologies may include, but are not limited to: heat, finger pressure, high capture rate cameras, infrared light, optic capture, tuned electromagnetic induction, ultrasonic receivers, transducer microphones, laser rangefinders, shadow capture, and the like. According to an embodiment, the touch input device may be configured to detect near-touches (i.e. within some distance of the touch input device but not physically touching the touch input device). The touch input device may also act as a display 28. The input/output controller 22 may also provide output to one or more display screens, a printer, or other type of output device.

A camera and/or some other sensing device may be operative to record one or more users and capture motions and/or gestures made by users of a computing device. Sensing device may be further operative to capture spoken words, such as by a microphone and/or capture other inputs from a user such as by a keyboard and/or mouse (not pictured). The sensing device may comprise any motion detection device capable of detecting the movement of a user. For example, a camera may comprise a MICROSOFT KINECT® motion capture device comprising a plurality of cameras and a plurality of microphones.

Embodiments of the invention may be practiced via a system-on-a-chip (SOC) where each or many of the components/processes illustrated in the FIGURES may be integrated onto a single integrated circuit. Such a SOC device may include one or more processing units, graphics units, communications units, system virtualization units and various application functionality all of which are integrated (or "burned") onto the chip substrate as a single integrated circuit. When operating via a SOC, all/some of the functionality, described herein, may be integrated with other components of the computer 100 on the single integrated circuit (chip).

As mentioned briefly above, a number of program modules and data files may be stored in the mass storage device 14 and RAM 9 of the computer 100, including an operating system 16 suitable for controlling the operation of a networked computer, such as the WINDOWS SERVER®, WINDOWS 7® operating systems from MICROSOFT CORPORATION of Redmond, Wash.

The mass storage device 14 and RAM 9 may also store one or more program modules. In particular, the mass storage device 14 and the RAM 9 may store one or more applications 24, such as a pipeline manager 26, productivity applications (e.g. a content management application such MICROSOFT SHAREPOINT), and may store one or more Web browsers 25. The Web browser 25 is operative to request, receive, render, and provide interactivity with electronic documents, such as a Web page. According to an embodiment, the Web browser comprises the INTERNET EXPLORER Web browser application program from MICROSOFT CORPORATION.

Pipeline manager 26 is configured to assist in configuration of a query pipeline for an enterprise search system. A user (e.g. user of the enterprise search system and/or administrator of the enterprise search system) may create rules for custom query transformation and parallel query generation, federation of queries, and application of display layouts to the received search results. A user interface (UI) is displayed that assists a user in configuring the search pipeline. For example, a user may enter condition action rules for queries that affect how a query is transformed, how parallel queries are generated, how queries are federated, and how search results are ranked and displayed Pipeline manager 26 may be configured as an application and/or as part of a cloud based multi-tenant service that provides resources (e.g. services, data . . . ) to different tenants (e.g. MICROSOFT OFFICE 365, MICROSOFT SHAREPOINT ONLINE). Additional details regarding the operation of pipeline manager 26 will be provided below.

Figure 2:
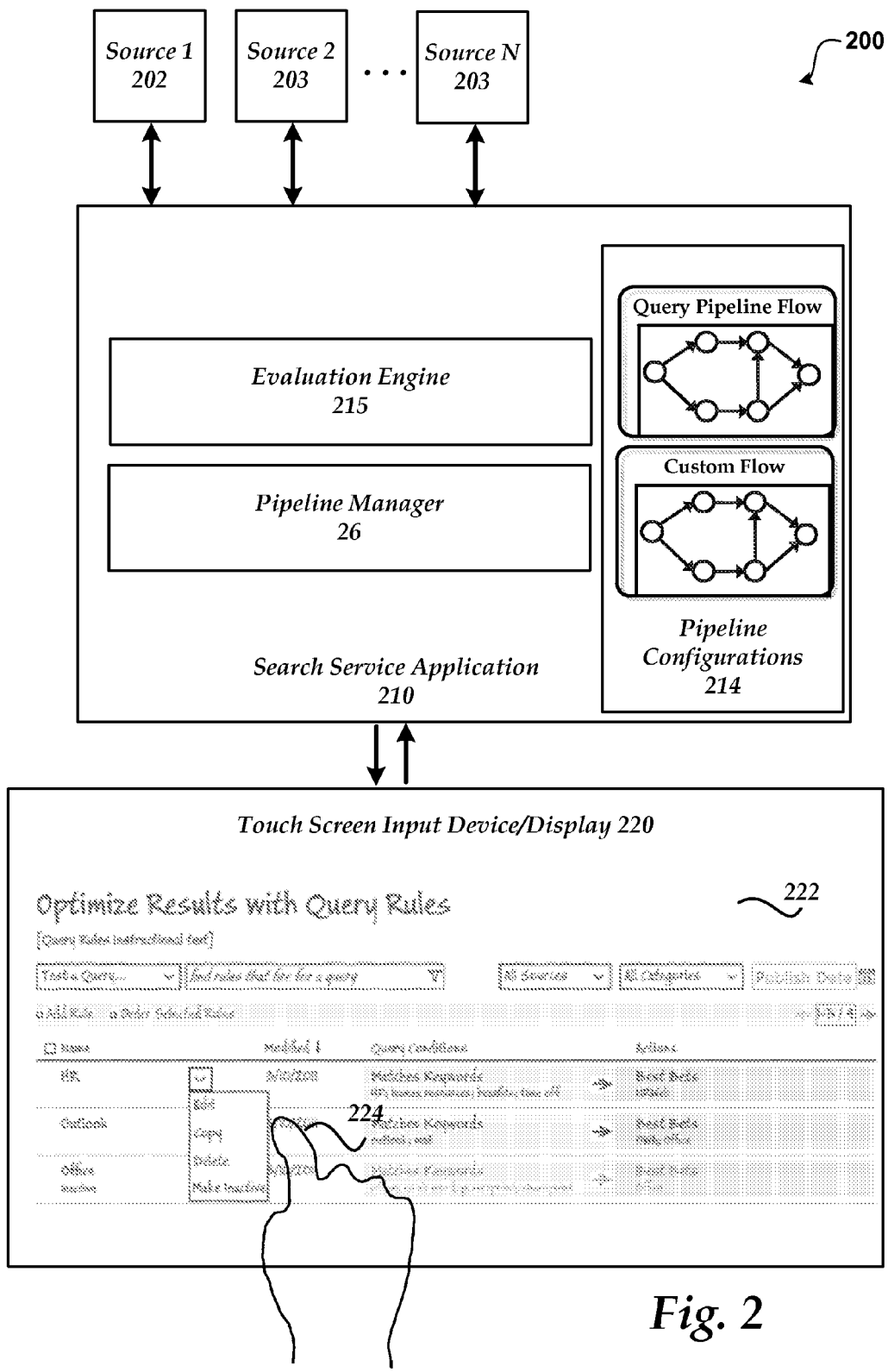
FIG. 2 illustrates an exemplary system for configuring a search pipeline.

FIG. 2 illustrates an exemplary system for configuring a search pipeline. As illustrated, system 200 includes search service application 210, pipeline manager 26, evaluation engine 215, pipeline configurations 214, sources 1-N and touch screen input device/display 220. Search service application 210 may be a part of another system (e.g. a cloud based and/or enterprise based application such as MICROSOFT SHAREPOINT) or a separate application/service.

Touch input system 200 as illustrated comprises a touch screen input device/display 220 that detects when a touch input has been received (e.g. a finger touching or nearly touching the touch screen). Any type of touch screen may be utilized that detects a user's touch input. For example, the touch screen may include one or more layers of capacitive material that detects the touch input. Other sensors may be used in addition to or in place of the capacitive material. For example, Infrared (IR) sensors may be used. According to an embodiment, the touch screen is configured to detect objects that in contact with or above a touchable surface. Although the term "above" is used in this description, it should be understood that the orientation of the touch panel system is irrelevant. The term "above" is intended to be applicable to all such orientations. The touch screen may be configured to determine locations of where touch input is received (e.g. a starting point, intermediate points and an ending point). Actual contact between the touchable surface and the object may be detected by any suitable means, including, for example, by a vibration sensor or microphone coupled to the touch panel. A non-exhaustive list of examples for sensors to detect contact includes pressure-based mechanisms, micro-machined accelerometers, piezoelectric devices, capacitive sensors, resistive sensors, inductive sensors, laser vibrometers, and LED vibrometers.

As illustrated, touch screen input device/display 220 shows an exemplary UI display for editing query rules and configuring a pipeline for processing a query (See FIGS. 6-24 for other exemplary UI displays). Pipeline manager 26 is configured to receive input from a user (e.g. using touch-sensitive input device 202 and/or keyboard input (e.g. a physical keyboard and/or SIP)) for configuring a pipeline for a search service. For example, pipeline manager 26 may receive touch input 224 that is associated with a UI 222 for configuring the search pipeline.

The pipeline manager 26 may be stored at one or more locations and may be accessed from one or more different locations. For example, a user may access a cloud-based pipeline manager using a web browser , using a locally installed pipeline manager that is configured to communicate with the search service application, and/or a combination of a cloud based service and an installed pipeline manager.

Pipeline manager 26 is configured to allow a user to configure different pipeline configurations. Generally, the user configures a set of condition-action rules over queries that may specify rule conditions and contextual information to which the rules apply. Rule conditions are a predicate over a query and some contextual information such as settings, and the like. Rule actions, which are taken when the predicate is true, may transform the query and/or generate parallel queries that are transformed versions of the original query. The user then configures a set conditional rules over the search results. Each rule's condition is a predicate over the properties of a search result. The rule search conditional rules specify a display layout to apply to the result when the predicate is true. Many types of layouts may be defined to apply to search results.

Pipeline manager 26 may be configured to communicate with evaluation engine 215 for processing a query through the pipeline. Pipeline configurations 214 store different pipelines that may be used when processing queries.

Using the pipeline manager 26, a user may define query rules. For example, a user may use a UI to enter/edit query rules and define other configuration options relating to the search pipeline. Generally, processing a query comprises four steps including preparing the context, evaluating the rules, executing the queries, and preparing results.

Query rules may be configured to perform different actions. According to an embodiment, a query rule comprises a query class and a set of actions. The query class comprises a set of query conditions and a set of context conditions. The query conditions are predicates on the query. A query class can comprise multiple conditions on the query itself and on context. The context conditions are predicates on contextual information such as the source or category in which the query was performed. A query class may trigger multiple actions without re-entering its conditions. There may be many types of different actions that are associated with a query. According to an embodiment, there are three types of actions: assign a best bet to the query, create and display a result block, and change/replace the query that returns the core results. Other actions may be defined.

Assigning best bets to a query customize the search results that are returned. For example, best bets may be used to obtain additional results, promote results, and the like.

Result blocks specify how to transform the original query to obtain a set of related results. The result blocks may specify a template that defines how to display the results in a block. The result blocks may also specify a different result source, for which results are not normally available to the user. Result blocks may be displayed at a variety of different locations (e.g. shown above/below the core results, inserted within the core results, and the like).

Changing the query includes specifying a query transformation that is applied to the original query. The query transforms may provide a variety of transformations to a query. For example, one of the transformations is to use a different result source. For example it may query for results from the internet, or another search application, such as a people search. The transforms may apply to transformation of user queries and/or system queries.

A user may configure a large number of rules. According to an embodiment, the rules are unordered and are evaluated in parallel, and all rules where the query class matches are fired. According to an embodiment, actions across rules are determined as follows.

Best bets within a rule are shown in order. Then, across rules, the rules are ordered according to the more recently modified rule. For example, suppose rule A has best bets [b1, b2], and rule B has best bets [b3, b4]. Both A and B fire for a query. If A is most recently modified, the best bets are shown as [b1, b2, b3, b4]. If B is most recently modified, the best bets are shown as [b3, b4, b1, b2].

Result blocks shown above core results are ordered as with best bets. Blocks meant to be ranked are all considered candidates for ranking. A ranker chooses which to display and in which order (in practice, the ranker may also use the modified date to help infer priority).

Generally, a user configuring the pipeline does not have to worry about managing rule interactions. A user may, however, configure the interaction of the rules. The user can move a set of rules into an ordering group. Within the ordering group, the user may manually order rules as well as specify that when a particular rule fires then the other rules in the group should not fire (useful to help to ensure that only one "change the query" action fires).

According to an embodiment, query conditions comprise three variables for setting including SearchTerms, SubjectTerms, and ContextTerms. SearchTerms is the full original query. SubjectTerms is the terms in the original query that represent what the user is actually searching for. ContextTerms are terms in the original query that provide context for the main terms (e.g. by indicating the action the user wanted to perform with them, or by specifying an additional filter). Each specified query condition assigns these variables as appropriate. Then, the actions can make use of any variable that is set by the conditions.

Query rules can be set at different hierarchical levels. For example, in a cloud based service, query rules may be configured at the top Search Service level, a tenant level, a site collection level and a site level.

Figure 3:
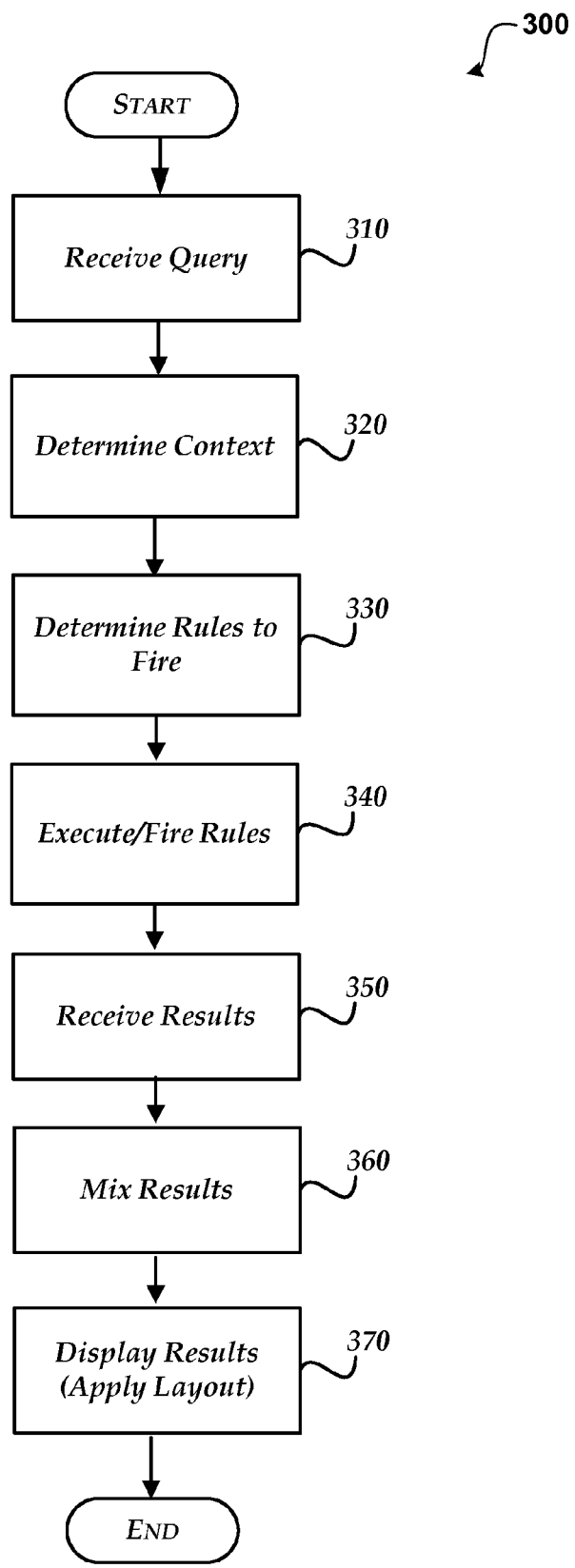
FIG. 3 illustrates processing a query using a user configured pipeline.
Figure 4:
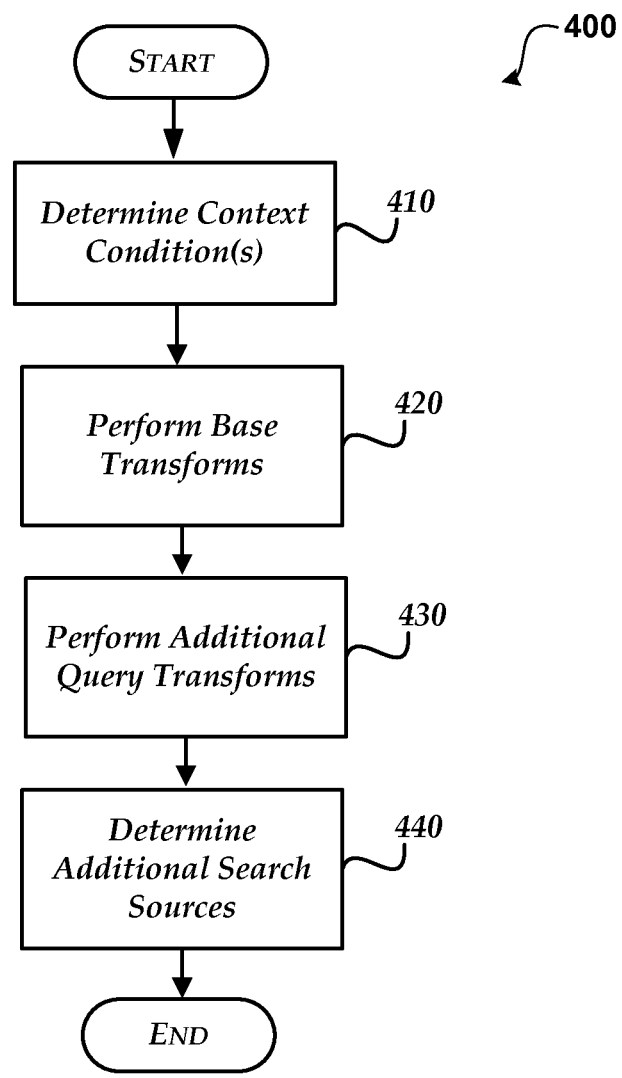
FIG. 4 shows a process for query transformation.
Figure 5:
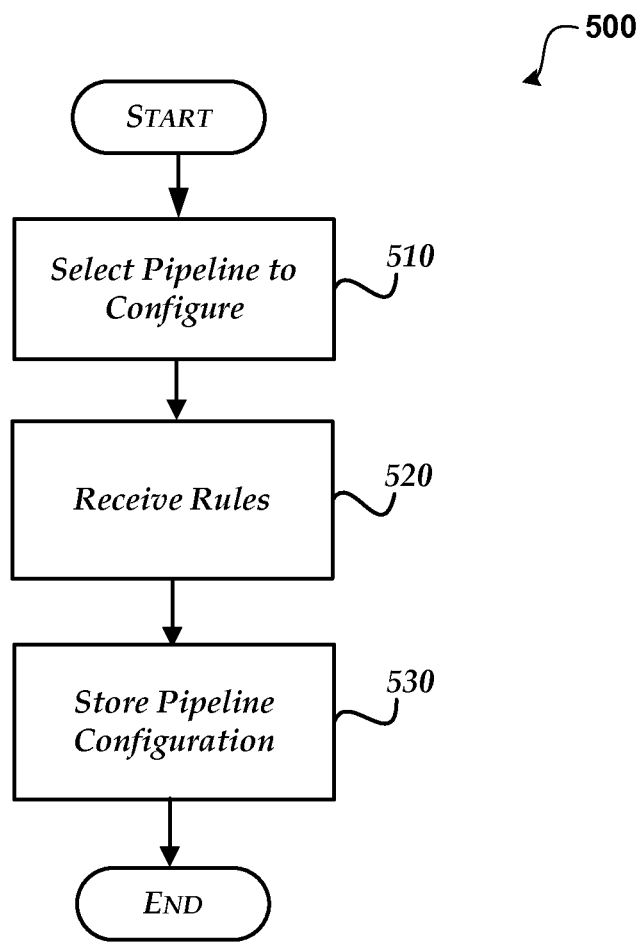
FIG. 5 illustrates a process for setting the configuration of a search pipeline.

FIGS. 3-5 show an illustrative process for configuring a search pipeline. When reading the discussion of the routines presented herein, it should be appreciated that the logical operations of various embodiments are implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations illustrated and making up the embodiments described herein are referred to variously as operations, structural devices, acts or modules. These operations, structural devices, acts and modules may be implemented in software, in firmware, in special purpose digital logic, and any combination thereof.

FIG. 3 illustrates processing a query using a user configured pipeline.

After a start operation, the process 300 flows to operation 310, where a search query is received. When a query is received it is processed according to the pipeline configuration that applies to the current query. According to an embodiment, the search query includes system query text that is generated by the system (e.g. not null) and may/may not include a user's query text (e.g. may be empty).

Moving to operation 320, the context is determined According to an embodiment, a query may be run in a test or evaluation mode. When the query is in an evaluation mode different configuration information obtained. The user's pipeline configuration is obtained (either from a cache or, if it is not cached, from storage). The context related to the query also specifies rules and/or actions to apply to the received query. The context conditions are used to decide whether the behavior rule is appropriate for the context. For example, the context may refer to a source that the rule is associated with, a user context object to apply, or an app id (if one were available). Context conditions derive their context from any available query property. A context condition is a Boolean expression over context. For example, the following Boolean expression may be a context condition:

(Source=people AND gender!=male AND resultsrequested>500)

(recommenderfillin)
(usercontext=dev and area=USA)

After determining the context, the process flows to operation 330, where the rules to fire are determined Query rules may fire on a system query which has no user query text, but other "context" (represented as properties of the query object) that could be matched as part of the rules. Rules whose predicates do not match the query's determined contextual information are discarded. Rules whose conditions do not match the query's text are discarded. The remaining rules, whose predicates are true for both the query's contextual information and query text, are determined to be fired. According to an embodiment, a determination is made as to whether rules are to be evaluated for the received query. For example, rules may be evaluated for simple keyword queries but not for advanced queries since a user performing an advanced query may be interested in receiving just the standard search results. According to an embodiment, the rules are evaluated for all received queries.

Transitioning to operation 340, the determined rules are executed. Executing the queries includes applying the actions of each fired rule. These actions can transform the query and/or generate parallel queries that are transformed versions of the original query. According to an embodiment, each query, including the original query, is represented by a routing record. The routing records are used to route the queries to the appropriate source/search provider (e.g., the local index, a remote index, and the like).

Moving to operation 350, the results from each of the fired queries is received. Each of these routed queries may return a set of results. The results may be returned in one or more formats. For example, a first search provider may return search results in a first format, whereas another search provider returns results in another format.

Transitioning to operation 360, the returned results from each of the queries are mixed and/or ranked. According to an embodiment, the results from each generated query are put in a block, and these blocks are interleaved amongst the results of the original query. The blocks which are displayed, their order, and their location within the result list may be determined manually/automatically. For example, a user may specify how the results are displayed and/or the display of the results may be determined through machine learning. According to an embodiment, user requested results are stored in different user blocks. In this way, the user blocks may be displayed differently from the other result blocks. A "more" block may also be included that.

Moving to operation 370, the results are displayed. The mixed results are evaluated against the conditional rules over results configured by the user. When a rule is located whose condition matches the result, the corresponding display layout is applied to that result. According to an embodiment, a "best bet transform" interleaves its results before the base results and any other additional query transforms (but after best bets and personal favorites). A "last chance transform" interleaves below all base results and other additional query "blocks". The final mixed results, including their display layout, are then returned to the user for display. For example, the results may be returned to the user via: a client application (e.g. pipeline manager 26); a browser; and/or some other interface. The results may also include the display of a "more" block that allows a user to retrieve more related results to one or more of the blocks. For example, the more block may include a display of a link (e.g. horizontally/vertically, or in some other manner) that may be selected to retrieve more results.

The process then moves to an end operation and returns to processing other actions.

FIG. 4 shows a process for query transformation. A query transformation may perform different operations. For example, a source that is associated with the query can be replaced, the query may be reformulated based on defined rules, additional queries may be formulated, different sources may be selected and the like.

After a start operation, the process flows to operation 410 where context conditions for the query are determined. Context conditions are used to decide whether the behavior rule is appropriate for the context, for example, it may refer to a source that the rule is associated with, a user context object that must apply, or an app id (if one were available). Context conditions derive their context from available query properties. Queries may include arbitrary properties.

Moving to operation 420, any base query transforms are performed. Base query transforms replace the user text or query parameters of the base query. The source is not replaced. The results are placed in a results table with the same QueryID as the originating query object. According to an embodiment, this is the base results picked up by the core results. For example, the query: People:Puneet Narula may be replaced with People:Puneet Narula rankingModel=PeopleNameRank using the transform: People: {query} rankingModel=PeopleNameRank. According to an embodiment, when two replacement rules fire for a query, no replacement are made to the base query. Instead, the original base query is left untouched.

Flowing to operation 430, additional query transforms are performed. Additional Query Transforms are used to apply any valid transform to a query. Some transform rules will not change the source. For example, transform rule: <other><ppt>→LocalSharePoint: {other} fileextension=ppt OR fileextension=pptx transforms LocalSharePoint:Monthly Report PPT into LocalSharePoint:Monthly Report fileextension=ppt OR fileextension=pptx.

Others transforms will change the source: <PeopleName>→People: {query} rankingModel=PeopleNameRank. This will transform: LocalSharePoint:Puneet Narula into People:Puneet Narula rankingModel=PeopleNameRank.

Transitioning to operation 440, any additional search sources are determined. Any number of additional sources may be determined to which the search should be performed on/and or federated to. For example, a rule may specify that an additional enterprise source should be searched and that an outside federated source should be searched.

The process then moves to an end operation and returns to processing other actions.

FIG. 5 illustrates a process for setting the configuration of a search pipeline.

After a start operation, the process 500 flows to operation 510, where a pipeline to configure is determined. For example, a user may select a pipeline to modify/configure.

Moving to operation 520, the rules are received. For example, a user may specify the rules are received through a UI as illustrated in FIGS. 6-24.

Flowing to operation 530, the adjusted pipeline configuration is stored. The pipeline may be stored in different locations. For example, in a local data store, a network data store, at a cloud based service and the like.

The process then moves to an end operation and returns to processing other actions.

Figure 6:

FIG. 6 shows an exemplary query rules page. As illustrated, display 600 shows a list of different rules that have different options that can be exposed.

Figure 7:
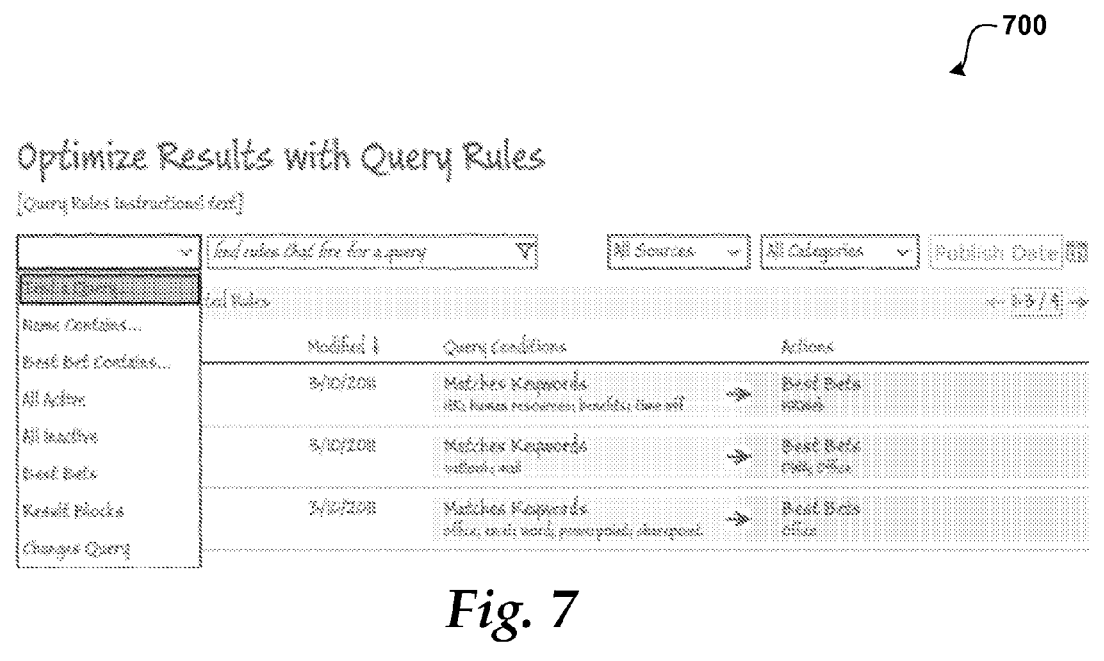

FIG. 7 shows an exemplary query rules page with a drop-down expanded. As illustrated, display 700 shows different actions that can be used to locate different types of queries.

Figure 8:
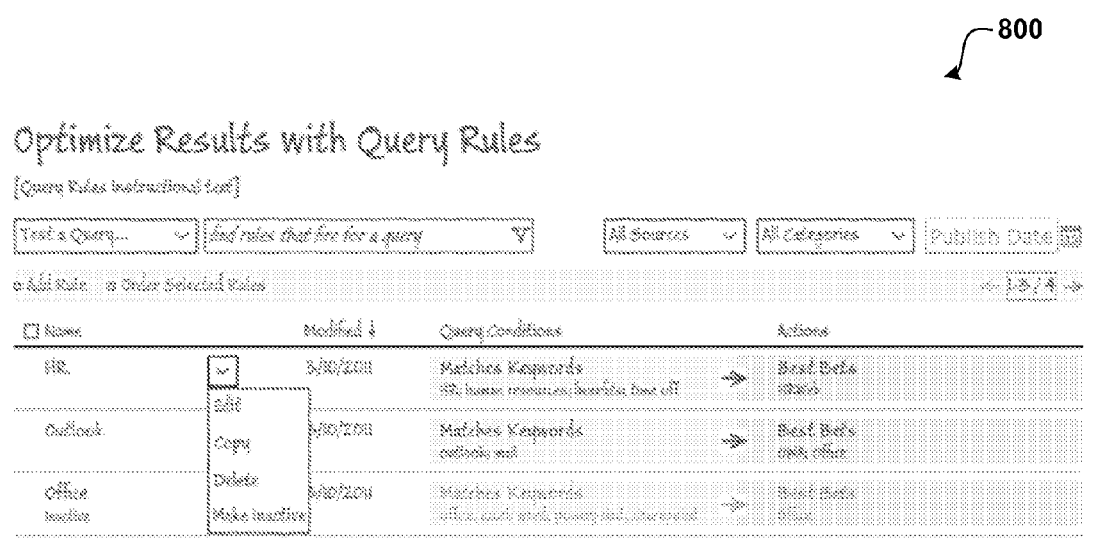

FIG. 8 shows an exemplary display of a query rules page showing selection of an action to perform on a rule. As illustrated, display 800 shows selection of an action (e.g. edit, copy, delete, make inactive) about a rule.

Figure 9:
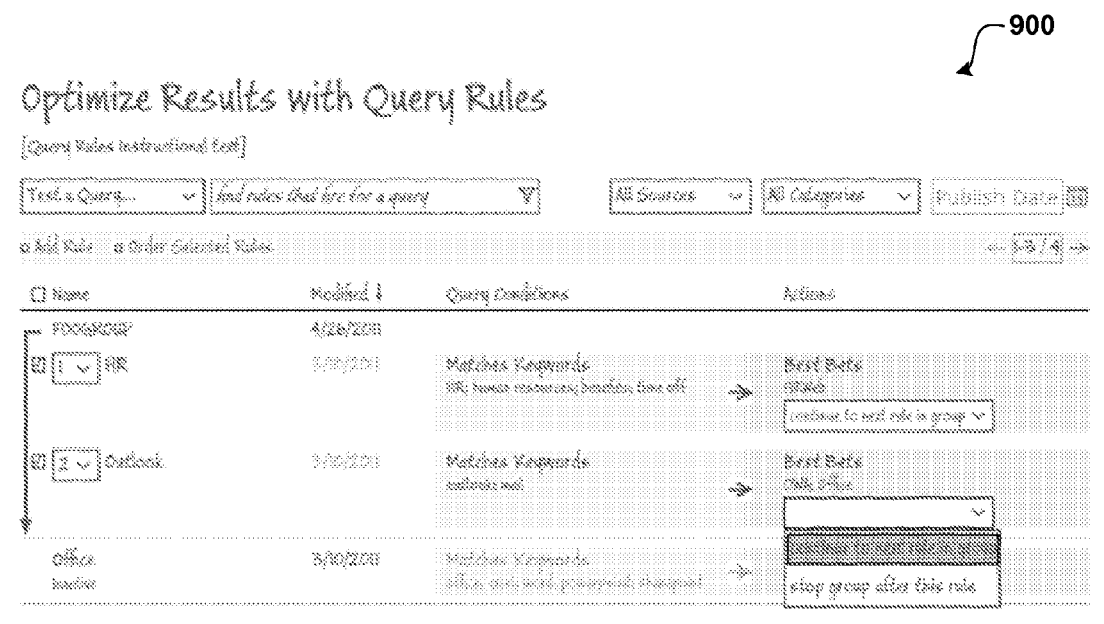

FIG. 9 shows an exemplary query rules page showing grouping of rules. As illustrated, display 900 shows a UI display for grouping rules in the displayed list.

Figure 10:
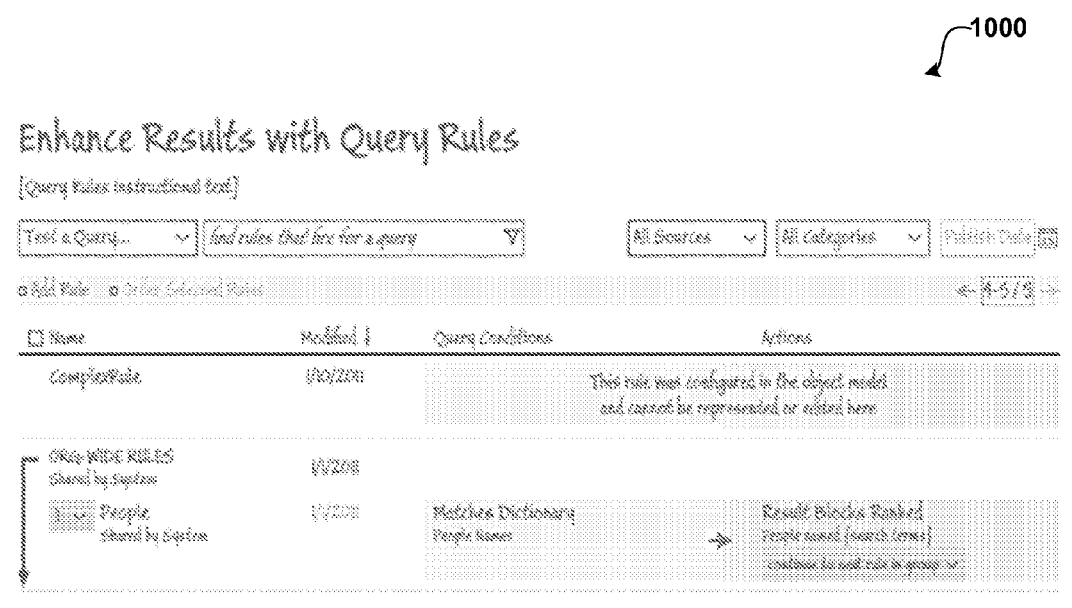

FIG. 10 shows exemplary query rules page. As illustrated, display 1000 shows a UI display for adding a query to a query set.

FIG. 11 shows an exemplary order rules dialog. As illustrated, display 1100 shows a UI display for configuration rules within a group.

Figure 12:
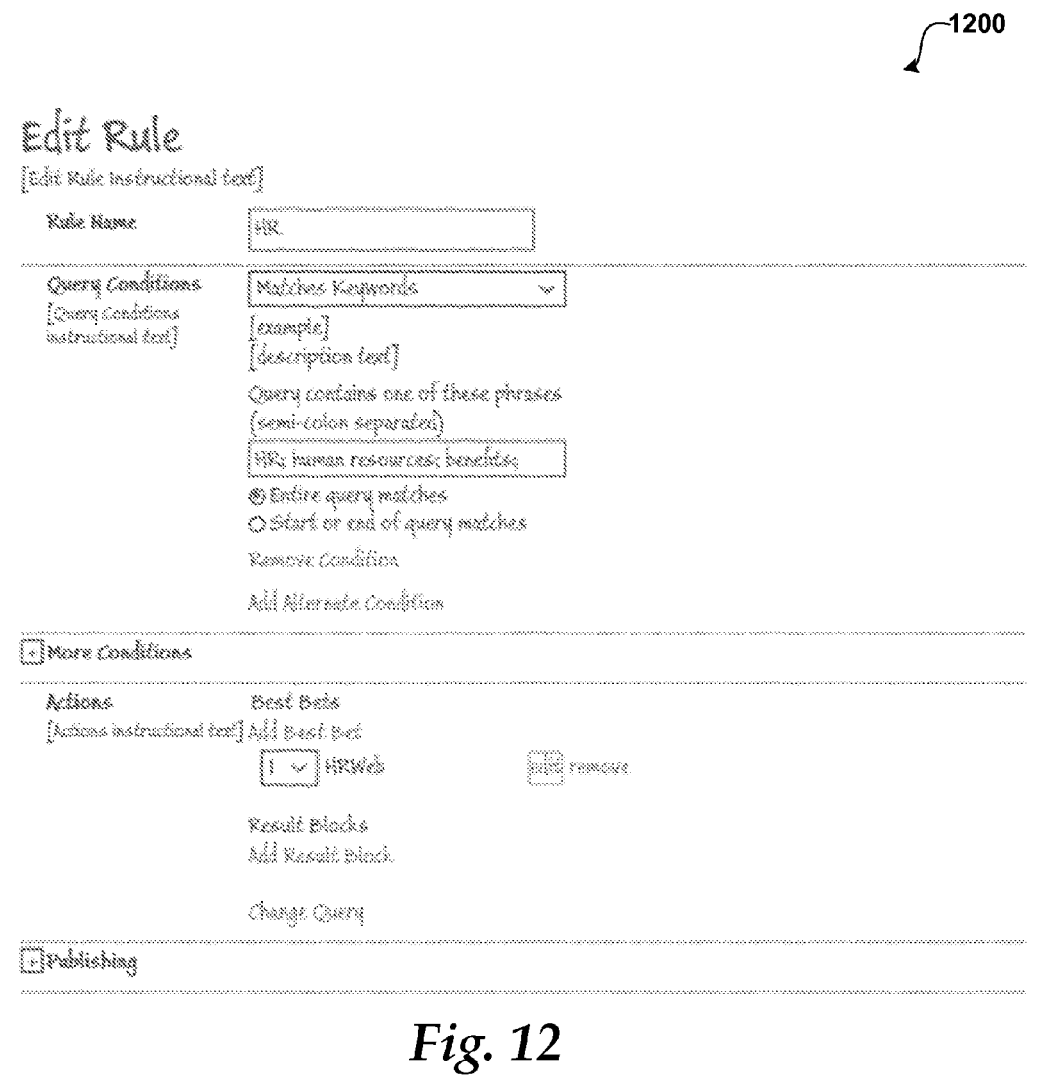

FIG. 12 shows an exemplary edit rules page. As illustrated, display 1200 shows a UI display for editing a rule.

FIG. 13 shows an exemplary edit rules page with an expanded query conditions menu. As illustrated, display 1300 shows a UI display for editing a rule that includes a display of various query conditions.

Figure 14:
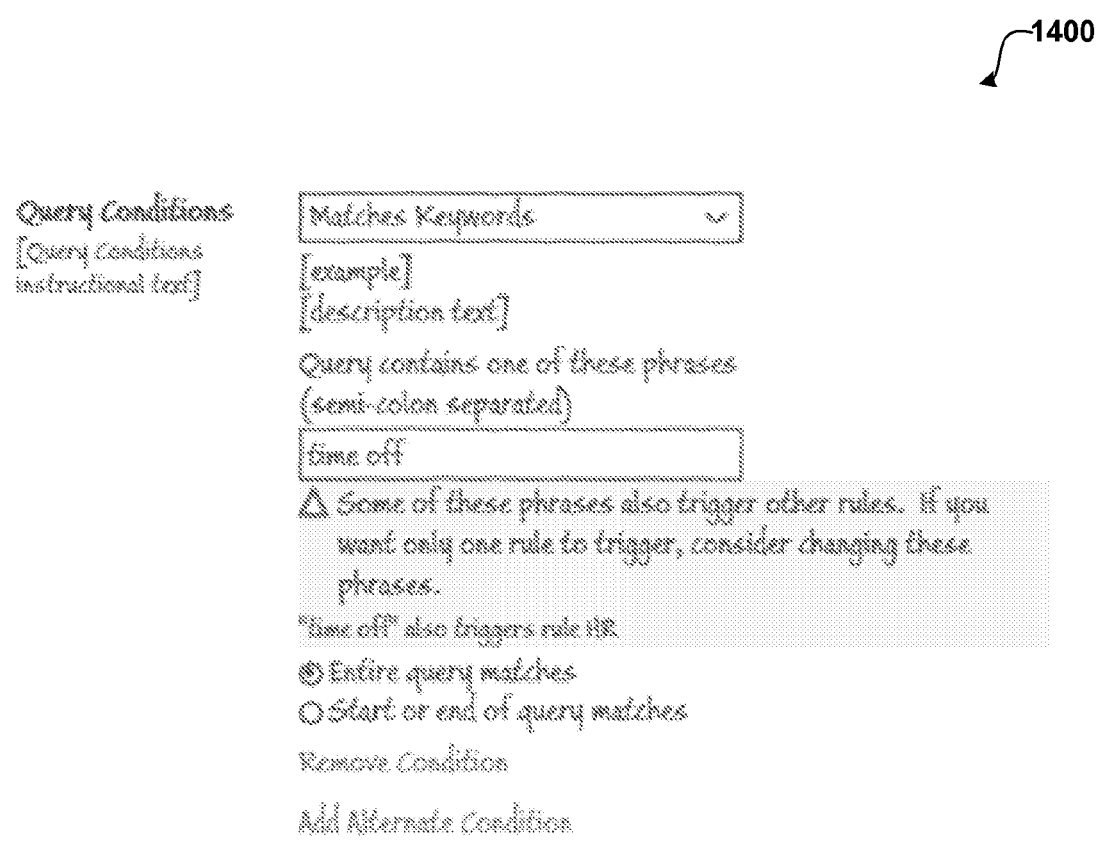

FIG. 14 shows an exemplary edit rules page with a matches keyword query condition selected. As illustrated, display 1400 shows that the UI changes as different options (e.g. matches keywords) are selected.

Figure 15:
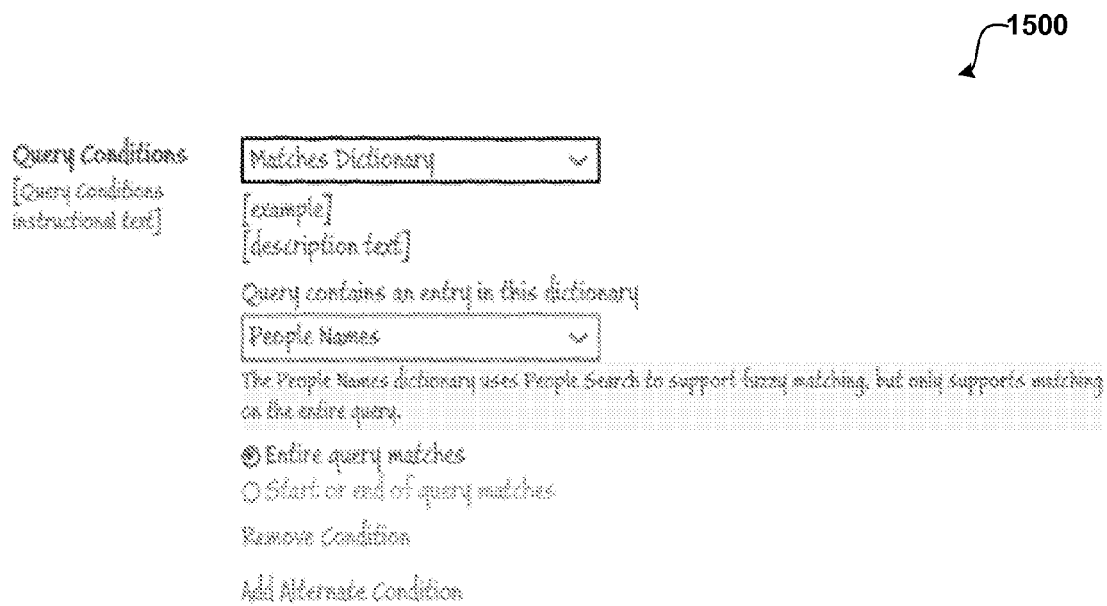

FIG. 15 shows an exemplary edit rules page with a matches dictionary query condition selected. As illustrated, display 1500 shows that the UI changes as different options (e.g. matches dictionary) are selected.

Figure 16:
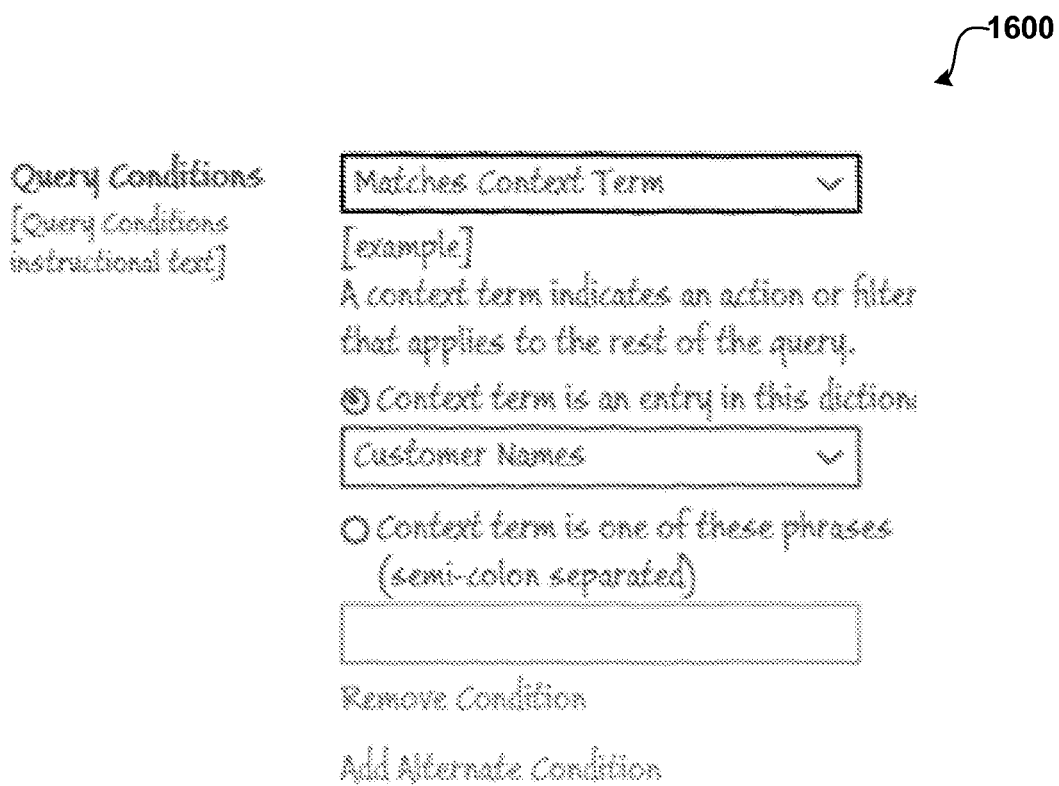

FIG. 16 shows an exemplary edit rules page with a matches context term query condition selected. As illustrated, display 1600 shows that the UI changes as different options (e.g. matches context term) are selected.

Figure 17:
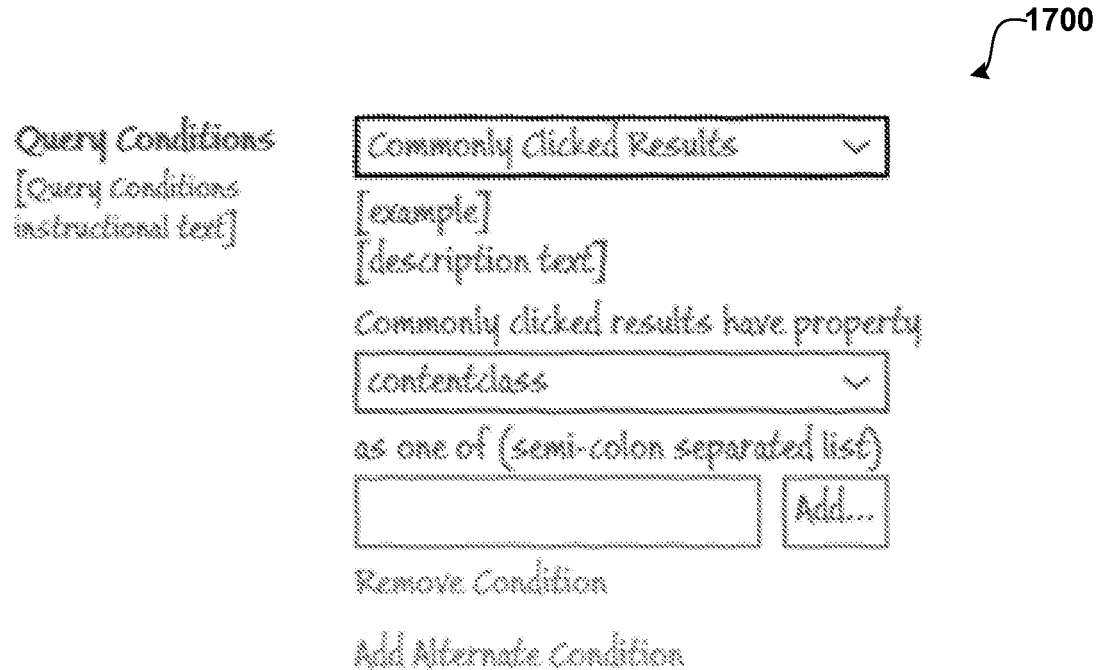

FIG. 17 shows an exemplary edit rules page with a commonly clicked results query condition selected. As illustrated, display 1700 shows that the UI changes as different options (e.g. commonly clicked results) are selected.

Figure 18:
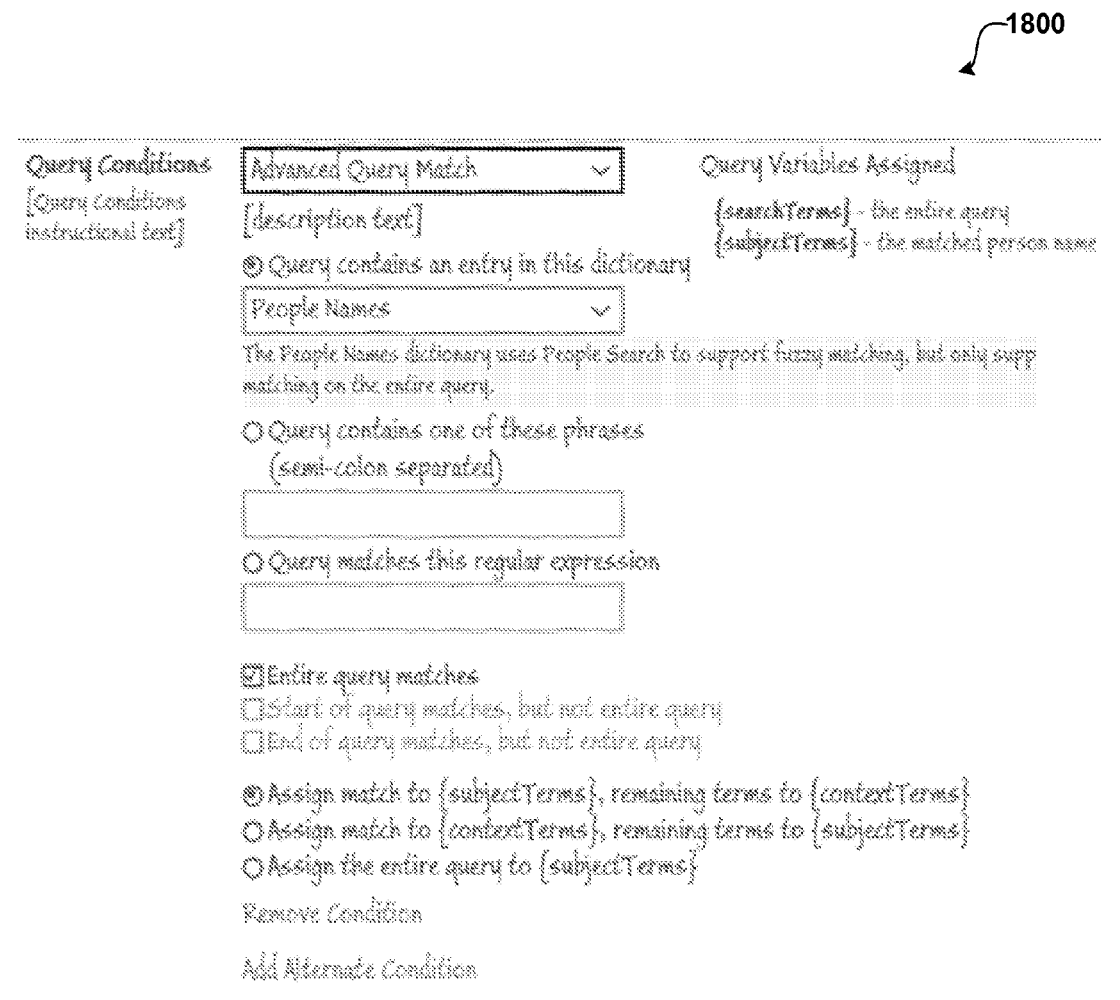

FIG. 18 shows an exemplary dialog for advanced query match. As illustrated, display 1800 shows a UI for setting advanced query match conditions.

FIG. 19 shows an exemplary dialog that shows setting more conditions relating to the query. As illustrated, display 1900 shows a UI for setting what sources the query is performed on.

FIG. 20 shows an exemplary publishing dialog. As illustrated, display 2000 shows a UI for setting when a rule is published.

FIG. 21 shows an exemplary add search source dialog. As illustrated, display 2100 shows a UI for selecting a federated source to add.

Figure 22:
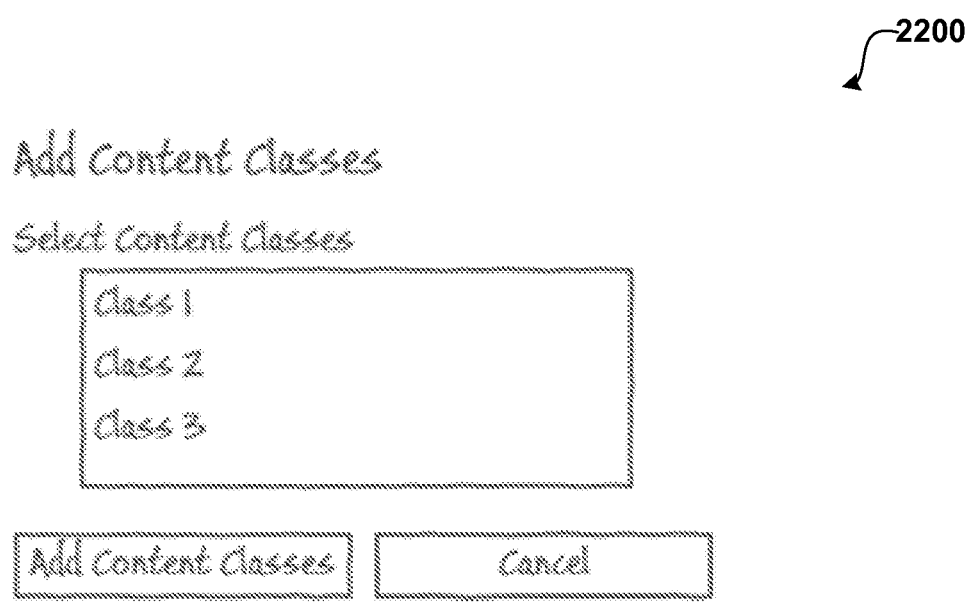

FIG. 22 shows an exemplary add content class dialog. As illustrated, display 2200 shows a UI for selecting and adding content classes.

FIG. 23 shows an exemplary add best bet dialog. As illustrated, display 2300 shows a UI for adding a best bet or using an existing best bet.

FIG. 24 shows an exemplary edit results block dialog. As illustrated, display 2400 shows a UI for editing a results block.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for processing queries, comprising:
    receiving user input creating a pipeline configuration for executing a query from an input device;
    receiving a first query;
    obtaining a context and conditions of the first query;
    determining rules based on the context and the conditions of the first query by utilizing the pipeline configuration, wherein the rules are triggered in response to receiving the first query;
    applying the rules to the first query to determine additional queries to execute;
    executing the additional queries;
    receiving supplemental results from execution of each of the additional queries;
    receiving core results from execution of the first query; and
    mixing the received supplemental results with the core results to form mixed results.

2. The method of claim 1, wherein the rules comprise one or more of: a transformation of the first query into a different query; generating a parallel query, and performing a federated search.

3. The method of claim 1, further comprises displaying each of the mixed results according to a user-defined rule.

4. The method of claim 1, wherein executing the additional queries comprises: performing a federated search and executing parallel queries that are created in response to applying the rules to the first query.

5. The method of claim 1, wherein obtaining the context of the first query comprises obtaining another pipeline configuration that is associated with the first query from a cache that specifies the rules to apply to the first query.

6. The method of claim 1, further comprising placing the received supplemental results from each of the executed additional queries into a separate block that is interleaved amongst the core results of the first query.

7. The method of claim 6, further comprising determining which blocks to display, ordering the blocks that are displayed, and determining the location of each block as ordered within the core result by applying a display layout that specifies a layout of the blocks including the core results based on an evaluation against the rules.

8. The method of claim 1, further comprising specifying when the first query is to be fired in a test mode that obtains a different context as compared to when the first query is not fired in the test mode.

9. The method of claim 1, further comprising representing each additional query as a routing record within a search service application that specifies a source of the search for each of the additional queries to execute.

10. A computer storage device having computer-executable instructions for processing queries, comprising:
    receiving user input creating a pipeline configuration for executing a query from an input device;
    receiving a first query;
    obtaining a context and condition of the first query;
    determining rules based on the context and conditions of the first query by utilizing the pipeline configuration, wherein the rules are triggered in response to receiving the first query;
    applying the rules to the first query to determine additional queries to execute;
    executing the additional queries;
    receiving supplemental results from execution of each the additional queries; and
    mixing the received supplemental results with any core results to form mixed results.

11. The computer storage device of claim 10, wherein the rules comprise one or more of: a transformation of the first query into a different query; generating a parallel query, and performing a federated search.

12. The computer storage device of claim 10, further comprises displaying each of the mixed results according to a user-defined rule.

13. The computer storage device of claim 10, wherein executing the additional queries comprises: performing a federated search and executing parallel queries that are created in response to applying the rules to the first query.

14. The computer storage device of claim 10, wherein obtaining the context of the first query comprises obtaining another pipeline configuration that is associated with the first query from a cache that specifies the rules to apply to the first query.

15. The computer storage device of claim 10, further comprising placing the received supplemental results from each of the executed additional queries into a separate block that are interleaved amongst the core results of the first query.

16. The computer storage device of claim 15, further comprising determining which blocks to display, ordering the blocks that displayed, and determining the location of each block as ordered within the core results by applying a display layout based on an evaluation against the rules.

17. A system for processing queries, comprising:
- a network connection that is coupled to tenants of the multi-tenant service;
- a processor and a computer-readable medium;
- an operating environment stored on the computer-readable medium and executing on the processor; and
- a pipeline manager operating under the control of the operating environment and operative to:
- receiving user input creating a pipeline configuration for executing a query from an input device;
- receiving a first query;
- obtaining a context and conditions of the first query;
- determining rules based on the context and the conditions of the first query by utilizing the pipeline configuration, wherein the rules are triggered in response to receiving the first query;
- applying the rules to the first query to determine additional queries to execute;
- executing the additional queries;
- receiving supplemental results from execution of each the additional queries; and
- mixing the received results with any core results to form mixed results.

18. The system of claim 17, wherein the rules comprise one or more of: a transformation of the first query into a different query; generating a parallel query, and performing a federated search.

19. The system of claim 17, further comprises displaying each of the mixed results according to a user-defined rule.

20. The system of claim 17, wherein executing the additional queries comprises: performing a federated search and executing parallel queries that are created in response to applying the rules to the first query.

* * * * *